United States Patent [19]

Ohta et al.

[11] 4,296,680
[45] Oct. 27, 1981

[54] COUPLED SHELLS FOR VACUUM POWER SERVO BOOSTER

[75] Inventors: Ryuji Ohta; Michio Kobayashi, both of Matsuyama, Japan

[73] Assignee: Jidosha Kiki Co., Ltd., Tokyo, Japan

[21] Appl. No.: 85,830

[22] Filed: Oct. 17, 1979

[30] Foreign Application Priority Data

Dec. 1, 1978 [JP] Japan .................. 53/148803
Dec. 1, 1978 [JP] Japan .................. 53/148804

[51] Int. Cl.³ .................. F01B 19/00; F16J 3/02
[52] U.S. Cl. .................. 92/98 D; 220/295
[58] Field of Search .......... 92/98 D, 99; 91/369 R, 91/369 A, 369 B; 220/293, 295, 298

[56] References Cited

U.S. PATENT DOCUMENTS

| | | | |
|---|---|---|---|
| 2,969,046 | 1/1961 | Kellogg | 92/99 |
| 3,053,235 | 9/1962 | Hager | 92/99 |
| 3,216,608 | 11/1965 | McCormick | 220/295 |
| 3,319,420 | 5/1967 | Mercier | 92/98 D |
| 3,656,413 | 8/1972 | Eggstein | 92/98 D |
| 3,760,693 | 9/1973 | Myers | 92/99 |
| 3,768,379 | 10/1973 | Gardner | 92/99 |
| 4,038,822 | 8/1977 | Dodge | 92/98 D |

Primary Examiner—Abraham Hershkovitz
Attorney, Agent, or Firm—Sughrue, Mion, Zinn, Macpeak and Seas

[57] ABSTRACT

A vacuum power servo booster including a disc-shaped inner shell and a cup-shaped outer shell with a diaphragm secured between the two shells. A radially opening annular groove is formed in peripheral portions of the inner shell by a first annularly bent portion bulging radially inwardly and a second annularly bent portion oriented along the axial direction of the booster. The outer shell includes rectangular recesses into which extend inwardly at the open faces.

6 Claims, 6 Drawing Figures

COUPLED SHELLS FOR VACUUM POWER SERVO BOOSTER

BACKGROUND OF THE INVENTION

This invention relates to a vacuum power servo booster, and more particularly, to a technique for coupling together shells of the vacuum power servo booster, which shells fixedly secure a peripheral end portion of a diaphragm.

Conventional vacuum power servo boosters such as a power brake servo booster and a power clutch servo booster include a pair of shells forming an outer casing and a flexible diaphragm supported between the shells which divides the casing into two chambers. FIG. 1 shows such a conventional power brake servo booster 21 in which the diaphragm is secured by the shells as shown. At peripheral end portions of a pair of shells 22, 23, flanges 25, 26 extend radially outwardly in an opposing relationship to couple the shells 22, 23 together. The peripheral end portion of a diaphragm 24 is interposed between the opposing flanges. This type of power servo booster is bulky in that the presence of flanges 25, 26 prevents the booster 21 from being made more compact relative to the effective diameter of the shells, the effective diameter being determinative of the power output of the booster.

In order to overcome this drawback, there has been proposed a structure as described in U.S. Pat. No. 3,656,413 in which, as shown in FIGS. 2 and 4 thereof, a diaphragm 5 is provided with beading 51 around its outer peripheral edge. During assembly of the servo-device, the beaded edge 51 is clamped between a cylindrical wall 11, a channel 22 formed at the outer periphery of a cover plate 2 and a flanged ring 6 which is secured to the inner face of the cover plate 2. The channel 22 has spaced apertures and deformable lugs 12 on the adjacent end portions of the cylinder wall 11 which pass through the apertures and are bent through about 90° to secure the cover plate 2 to the cylinder 1. It is intended with this structure to minimize the difference between the effective diameter of the cylinder and the external diameter of the power servo device to thus obtain high output in a compact device.

However, during assembly, the outer peripheral surface of the beading 21 may be damaged by the inner peripheral surface of the cylinder wall 11, particularly by the inner end corner of the cylinder wall due to sliding contact therebetween. Further, after the cover plate 2 has been secured to the cylinder 1, it is almost impossible to subsequently disassemble the servo device.

SUMMARY OF THE INVENTION

It is therefore an object of the present invention to overcome the above-mentioned drawbacks and to provide an improved technique for coupling together shells of the vacuum power servo booster.

Another object of this invention is to provide a way of coupling shells of a vacuum power servo booster wherein the difference between effective diameters of the shells is minimized and the external diameter of the device provides a compact servo device while yet providing a high output.

Still another object of this invention is to provide such a technique for coupling together shells of a vacuum power servo booster wherein damage to the peripheral end portion of the diaphragm is prevented during assembly.

These and other objects are attained in accordance with the present invention by providing first and second annular bent portions at the peripheral end portion of the first shell (rear shell). The first annular bent portion bulges radially inwardly while the second annular bent portion is oriented approximately along the axial direction of the booster and bulges toward the second shell (front shell) to thereby provide an annular groove opening radially outwardly at the peripheral end portion of the first shell. The second shell has a cylindrical portion at a rear end portion thereof to allow insertion of the annular groove portion defined by the front and second annular bent portions. The first and second shells are coupled together with the peripheral end portion of the diaphragm secured between the inner surface of the cylindrical portion and the annular groove.

Further, in the case of the means for coupling shells for use in the power servo booster of the type capable of disassembly and re-assembly, the first shell is formed with the above-mentioned first and second annular bent portions to define the annular groove into which the peripheral end portion of the diaphragm fits and is secured in tight contact with the inner surface of the second shell. The second shell is further formed with locking pawls at the rear end face thereof and the first shell is further formed with recessed portions which allow the looking pawls to pass therethrough during rotation of the first shell within the second shell. The second shell also includes locking portions adapted to be engaged with the locking pawls. Rotation of the first shell is limited to a range defined by protrusions radially extending from the first shell and rectangular recesses formed in the second shell which allow sliding rotational movement of the protrusions therein. Each of the locking pawls is tapered inwardly so as to serve as a guide plate to thus gradually compress the peripheral end portion of the diaphragm during insertion of the first shell into the second shell whereby the peripheral end portion of the diaphragm is not damaged during assembly.

This invention will be described with reference to the accompanying drawings and the description of the preferred embodiments.

DETAILED DESCRIPTION OF THE PREFERRED EMBODIMENTS

Figure 1:
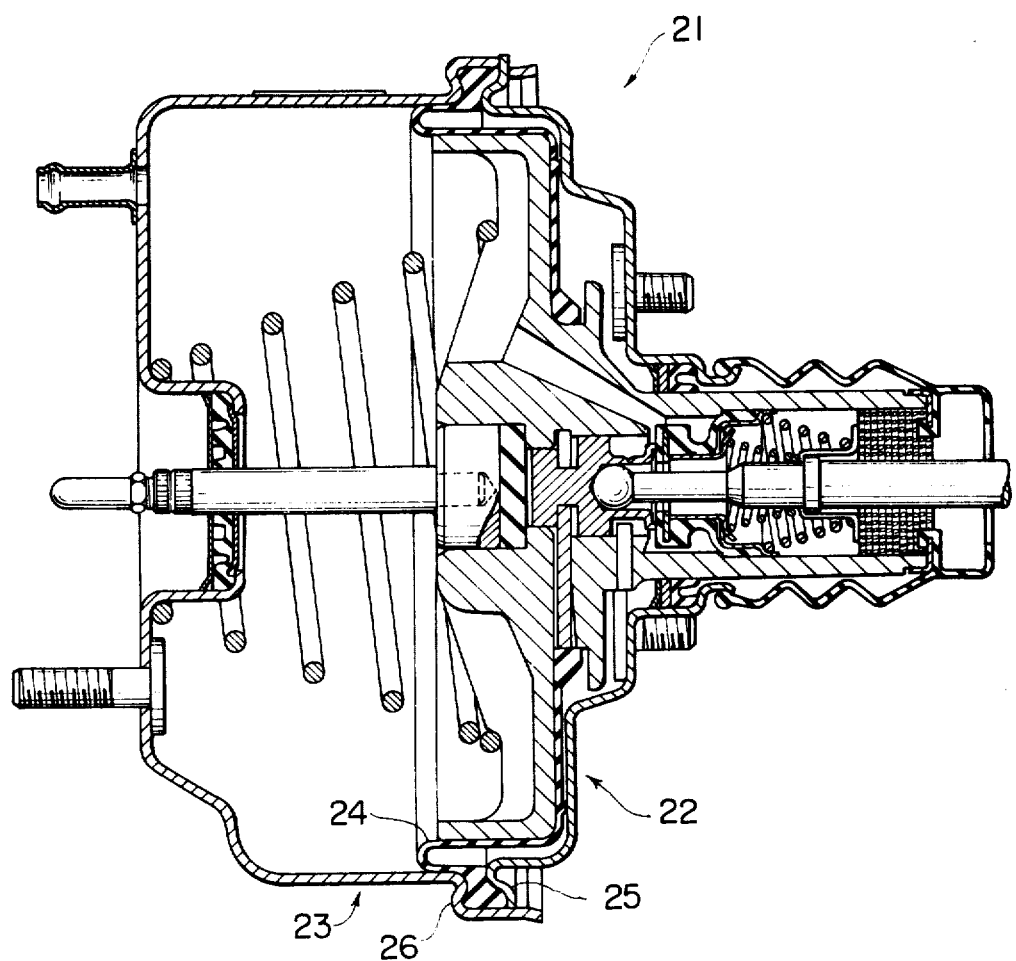
FIG. 1 is a cross-sectional view showing a conventional power brake servo booster.
Figure 2:
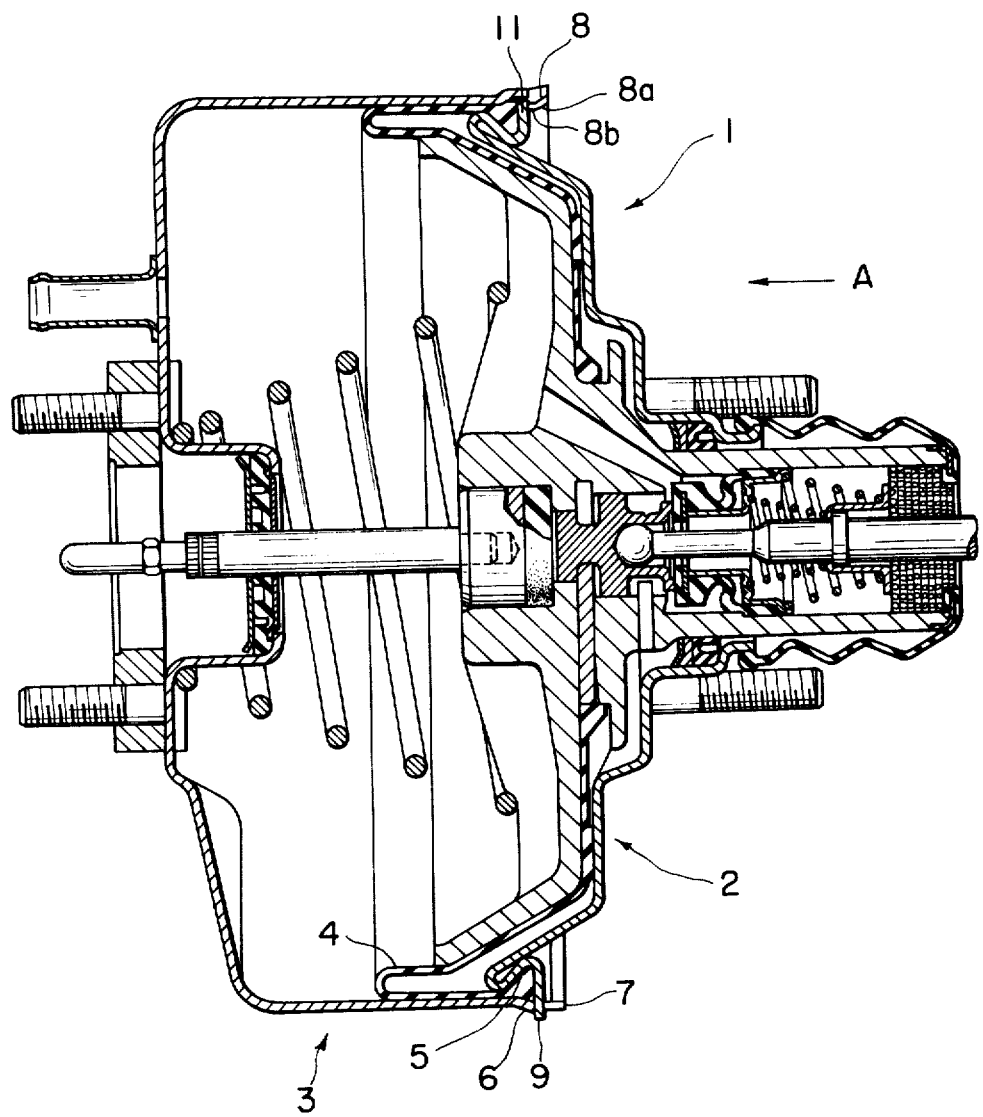
FIG. 2 is a cross-sectional view taken along the line II—II of FIG. 3 showing a power servo booster according to the present invention.
Figure 4:
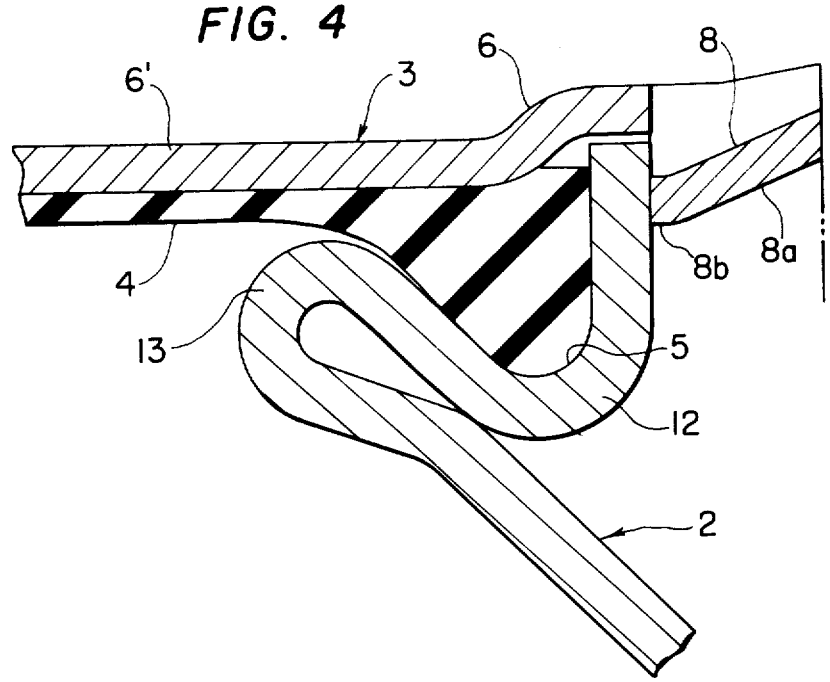
FIG. 4 is a cross-sectional view showing essential parts of the present invention.

A first embodiment according to the invention is shown in FIG. 2 wherein a power brake servo booster 1 is provided with a first shell 2 (rear shell) and a second shell 3 (front shell). The first shell 2 has a generally disc-like shape and is formed with an annular groove 5 adapted to receive an outer peripheral end portion of a diaphragm 4. As best shown in FIG. 4, the annular groove 5 formed at the peripheral end portion of the first shell 2 is defined by a first annular bent portion 12 which bulges radially inwardly from the peripheral end of the first shell 2 and a second annular bent portion 13 contiguous to the first annular bent portion 12. The second annular bent portion 13 is oriented approximately along the axial direction of the booster and is bulged toward the second shell 3.

Figure 3:
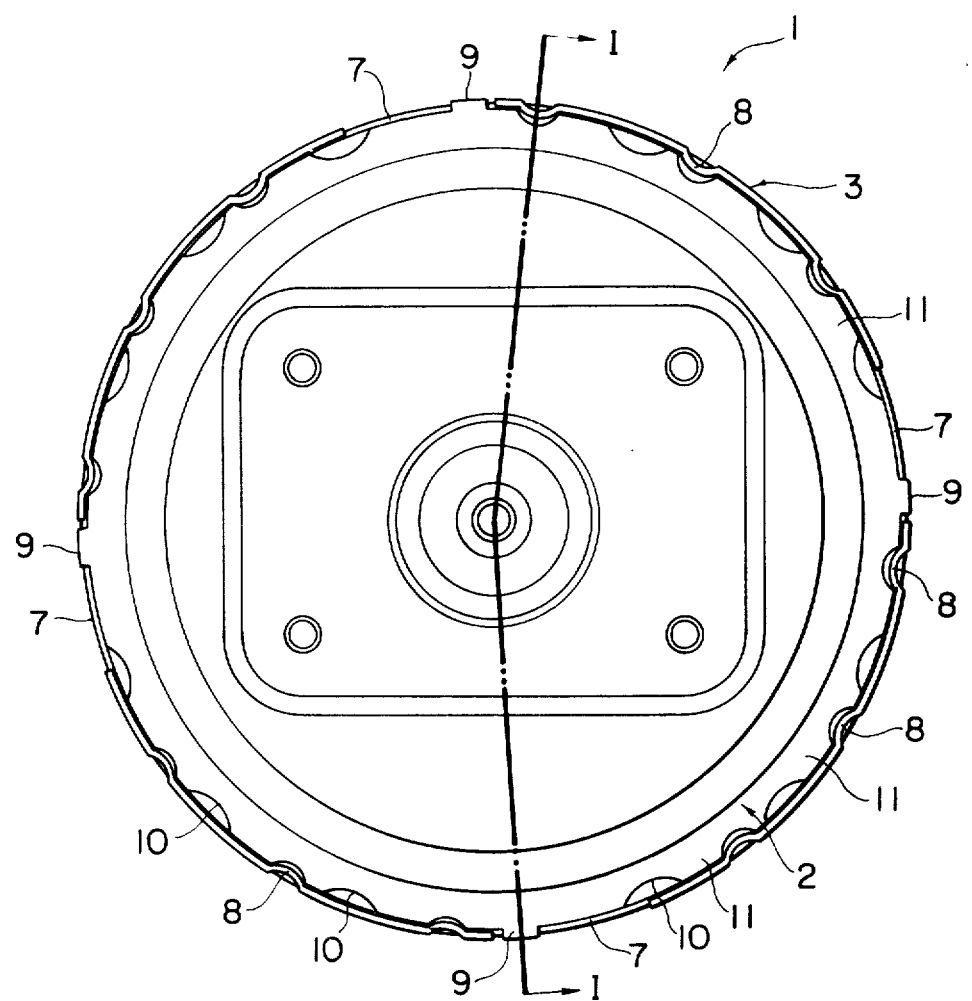
FIG. 3 is a rear view as viewed from the arrow A in FIG. 2 of a power servo booster according to the present invention.

The second shell 3 has a generally cup-like shape. As best shown in FIG. 4, the open end portion of the second shell 3 is formed with a gradually stepped cylindrical portion 6 having a slightly larger inner diameter than that of the remaining portion 6'. Further as shown in FIG. 3, a plurality of equally spaced rectangular recesses 7 are formed at the open end face of the second shell 3. The open end face of the second shell 3 is further formed with a plurality of locking pawls 8 at other than the positions of the recesses 7. Each of the locking pawls 8 has a radially inwardly directed arcuate shape. In this case, the distance between the bottom face of the recess 7 and an axially inward face of the locking pawl 8 is equal to the thickness of the first shell 2. Each of the inner surfaces of the locking pawls 8 is inwardly inclined toward the front side so as to provide a guide surface 8a.

Further, the outermost diameter of the first shell 2 is equal to the inner diameter of the end portion of the stepped cylindrical portion 6 of the second shell 3. The first shell 2 is further formed with protrusions 9 extending radially outwardly which are adapted to be slidingly positioned in the rectangular recesses 7. The relative rotational movement between the first and second shells 2, 3 is limited by the abutment of one of the side faces of the protrusion 9 against one of the side walls of the recess 7.

Furthermore, plural arcuate recesses 10 are formed at the peripheral end portion of the first shell 2. The arcuate recesses 10 are provided in order to avoid abutment between the first shell 2 and the arcuate locking pawls 8 formed in the second shell 3 when the one of the side faces of the protrusion 9 is in contact with the one of the side walls of the rectangular recess 7 while the first shell 2 is being fitted into the second shell 3. Between each of the arcuate recesses 10, a locking portion 11 is provided. The plural locking portions 11 engage with the inward end faces of the locking pawls 8 when the first and second shells 2, 3 are rotated relative to one another with the other side face of the protrusion 9 in abutment with the other side wall of the rectangular recess 7.

The other structures illustrated in the drawings and the associated function or operation are the same as those of a conventional power brake servo booster so that no further detailed explanation thereof is believed necessary.

With this structure, coupling between the first and second shells 2, 3 is carried out by the following manner. Firstly, the peripheral end portion of the diaphragm 4 is fitted into the annular groove 5 formed in the first shell 2. Then the first shell 2 is inserted into the second shell 3 with one of the side faces of the protrusions 9 of the first shell 2 in contact with one of the side walls of the recesses 7 wherein the arcuate recesses 10 of the first shell 2 are positioned coincident with the arcuate locking pawls 8 of the second shell 3. In this case, as shown in FIG. 4, although the locking pawls 8 are positioned in abutment against the peripheral end portion of the diaphragm 4 fitted in the annular groove 5, the inner surfaces of the locking pawls 8 are inclined to form the guide surface 8a so as to thus gradually compress and deform the peripheral end portion of the diaphragm 4 during insertion of the first shell 2 into the second shell 3 whereby the peripheral end portion of the diaphragm 4 slidingly passes through the locking pawls 8 smoothly without damage thereto.

Thereafter, the first shell 2 is rotated about its axis with respect to the second shell 3 until the other side faces of the protrusions 9 are in abutment with the other side walls of the recesses 7 so that the locking portions 11 of the first shell 2 are engaged with the inward surfaces of the locking pawls 8 of the second shell 3 thereby coupling the first shell 2 to the second shell 3.

According to the present invention, since the first shell 2 is formed with the first annular bent portion 12 bulging radially inwardly from the peripheral end portion thereof and the second annular bent portion 13 contiguous to the first bent portion 12 and oriented approximately along the axial direction of the booster 1 and bulging toward the second shell 3, the peripheral end portion of the diaphragm 4 is pressingly fitted in a space having a generally triangular shape in cross-section defined by the annular groove 5 formed at the peripheral end portion of the first shell and the cylindrical portion 6 of the second shell 3. The triangularly-shaped portion is resiliently supported by the second annular bent portion 13 bent at the position adjacent to the cylindrical portion so that this fitting state is stably maintained against any load produced by the power servo booster along the axial direction thereof. Further, the first and second annular bent portions 12, 13 reinforce the mechanical strength of the first shell 2 so that even employing a relatively thin metal plate, the first shell 2 may be produced by pressing techniques so as to integrally provide the first and second annular bent portions 12, 13.

Also, according to the embodiment shown in FIG. 4, the butt portion of the guide surface 8a is parallel to the axis of the booster as at 8b in order to enhance the rigidity of the locking pawls 8 although this feature is not an absolute necessity.

Figure 6:
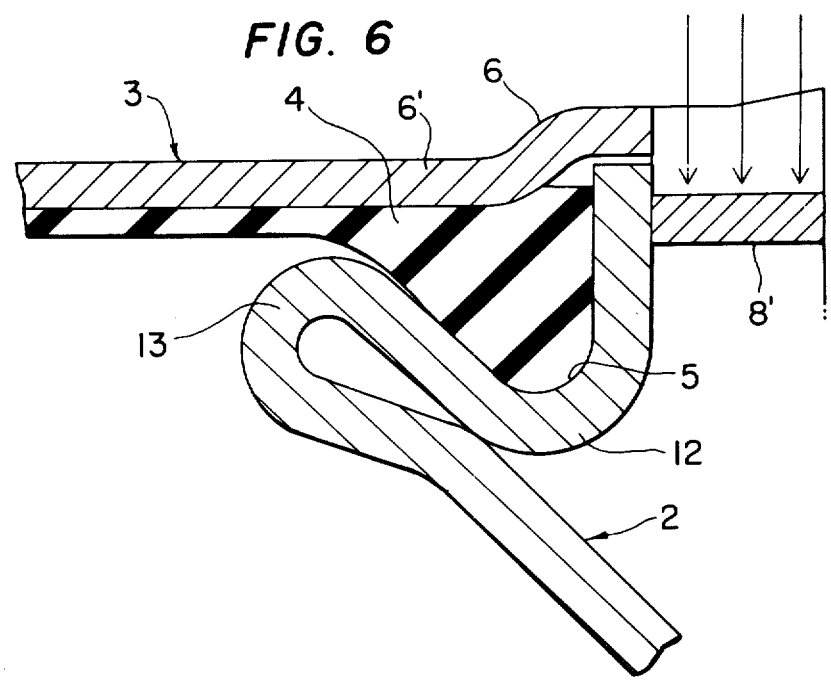
FIG. 6 is a cross-sectional view showing essential parts according to the second embodiment of the present invention.
Figure 5:
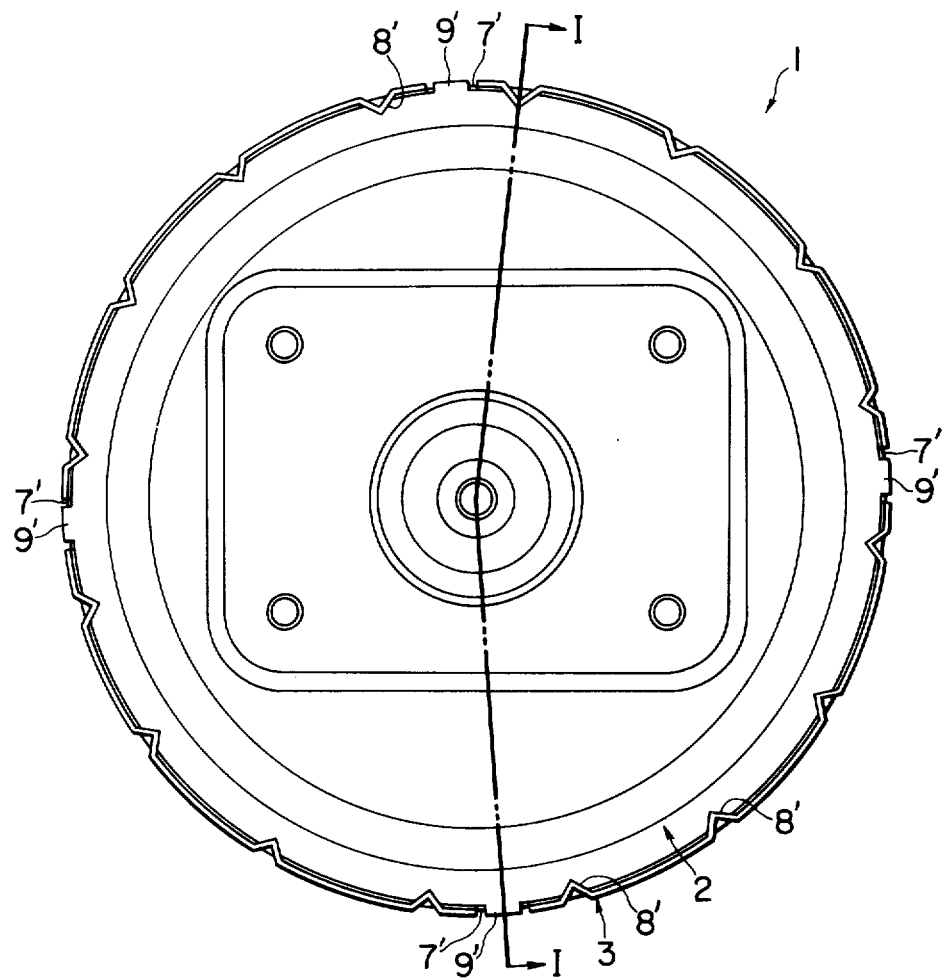
FIG. 5 is a rear view of a power servo booster according to a second embodiment of the present invention.

A second embodiment according to the invention is shown in FIGS. 5 and 6, wherein like parts and components are designated by the same reference numbers and characters as those shown in the first embodiment. The second embodiment specifically relates to a power servo booster 1' of the non-disassemblable type wherein the arcuate recesses 10 as seen in the first embodiment are not formed in the first shell 2. According to the second embodiment, the shapes of the first and second annular bent portions 12, 13 formed at the peripheral end portion of the first shell 2 are the same as those of the first embodiment.

The coupling between the first and second shells 2, 3 is carried out by the following manner. Firstly, the peripheral end portion of the diaphragm 4 is fitted into the annular groove 5, and then protrusions 9' extending radially outwardly from the first shell 2 are axially aligned with the recesses 7' formed in the second shell 3 and thereafter the first shell 2 is inserted into the second shell 3 until the protrusions 9' are in abutment with the recesses 7'. While this state maintained, the locking pawls 8' are formed at the open end portion of the second shell 3 by a pressing device which presses the appropriate portions radially inwardly as shown by arrows in FIG. 6 with the result that the first shell 2 is supported between the recesses 7' and the locking pawls 8' of the second shell 3 thereby coupling the first shell 2 to the second shell 3. In this case, since the peripheral end portion of the diaphragm 4 is tightly supported between the inner peripheral surface of the cylindrical portion 6 of the second shell 3 and the annular groove 5 of the first shell 2, a fluid-tight seal is maintained at the peripheral end portion of the diaphragm 4.

According to the first and second embodiments, the second shell 3 is provided with a stepped cylindrical portion 6 to aid in assembly and to maintain the dimensional stability of the fitting portions for the peripheral end of the diaphragm during press working and to maintain sealability. However, the stepped portion 6 can be omitted. Further, it goes without saying that other types of coupling members may be used for joining the shells 2, 3.

In view of the foregoing, according to the present invention, since the peripheral end portion of the diaphragm is interposed in a fluid-tight sealing arrangement between the annular groove formed at the peripheral end portion of the first shell which opens radially outwardly and the cylindrical portion of the second shell into which is inserted the first shell, the maximum external diameter of the power servo booster is approximately equal to the outer diameter of the cylindrical portion of the second shell therefore resulting in a compact booster in comparison with a conventional booster having flanges.

While the invention has been described in detail and with reference to specific embodiments thereof, it will be apparent to one skilled in the art that various changes and modifications can be made thereto without departing from the spirit and scope of the invention.

What is claimed is:

1. A vacuum power servo booster comprising:
 a generally disc-shaped first shell,
 a generally cup-shaped second shell, said first and second shells defining an outer casing of said booster, and
 a diaphragm secured between said first and second shells which divides the casing into two chambers,
 an annular groove being integrally formed at a peripheral end portion of said first shell, said annular groove opening radially outwardly and said annular groove being defined by a first annular bent portion bulging radially inwardly from the peripheral end portion of said first shell and a second annular bent portion at an inward position of said first shell, said second annular bent portion being oriented approximately along the axial direction of said booster and bulging toward said second shell,
 said second shell having a cylindrical portion adapted for insertion of said first shell therein, peripheral end portions of said diaphragm being interposed between said annular groove and said cylindrical portion, and
 said second shell being provided with at least one axial recess in said cylindrical portion, said first shell being provided with at least one radially outward protrusion adapted to be received in said recess, said first shell being further provided with a plurality of arcuate radial recesses at the outer peripheral surface thereof, and a plurality of locking portions arranged in an alternating manner between said recesses, said second shell being provided with locking means for engaging said locking portions, said locking means comprising radially inwardly extending arcuate locking pawls, said pawls being inclined toward the axis of said second shell so as to define guide surfaces, whereby peripheral portions of said diaphragm may smoothly pass over said guide surfaces in sliding contact therewith, without damage to said diaphragm.

2. The booster of claim 1, wherein said cylindrical portion is located at an open end portion of said second shell, said cylindrical portion having an inner diameter larger than that of the remaining portion of said second shell.

3. The booster of claim 1, wherein an outer diameter of said first shell is substantially equal to an inner diameter of said cylindrical portion of said second shell.

4. The booster of claim 1, wherein said arcuate locking pawls extend radially inwardly at an open end face of said second shell, the axial distance between bottom surface of each of said axial recesses and an axially inward surface of said locking pawls being equal to the thickness of said first shell.

5. The booster of claim 4, wherein each of said arcuate recesses is positioned coincident with corresponding ones of said arcuate locking pawls when first ones of the side faces of said protrusions are in contact with corresponding first ones of the side walls of said axial recesses and said locking pawls are engaged with said locking portions when second side face of said protrusions are in contact with corresponding second side walls of said axial recesses during relative rotation between said first and second shells.

6. The booster of claim 1, wherein said locking pawls are located at an open end of said second shell, said locking pawls being radially inwardly bulged to fixedly support said first shell.

* * * * *